Patented July 29, 1941

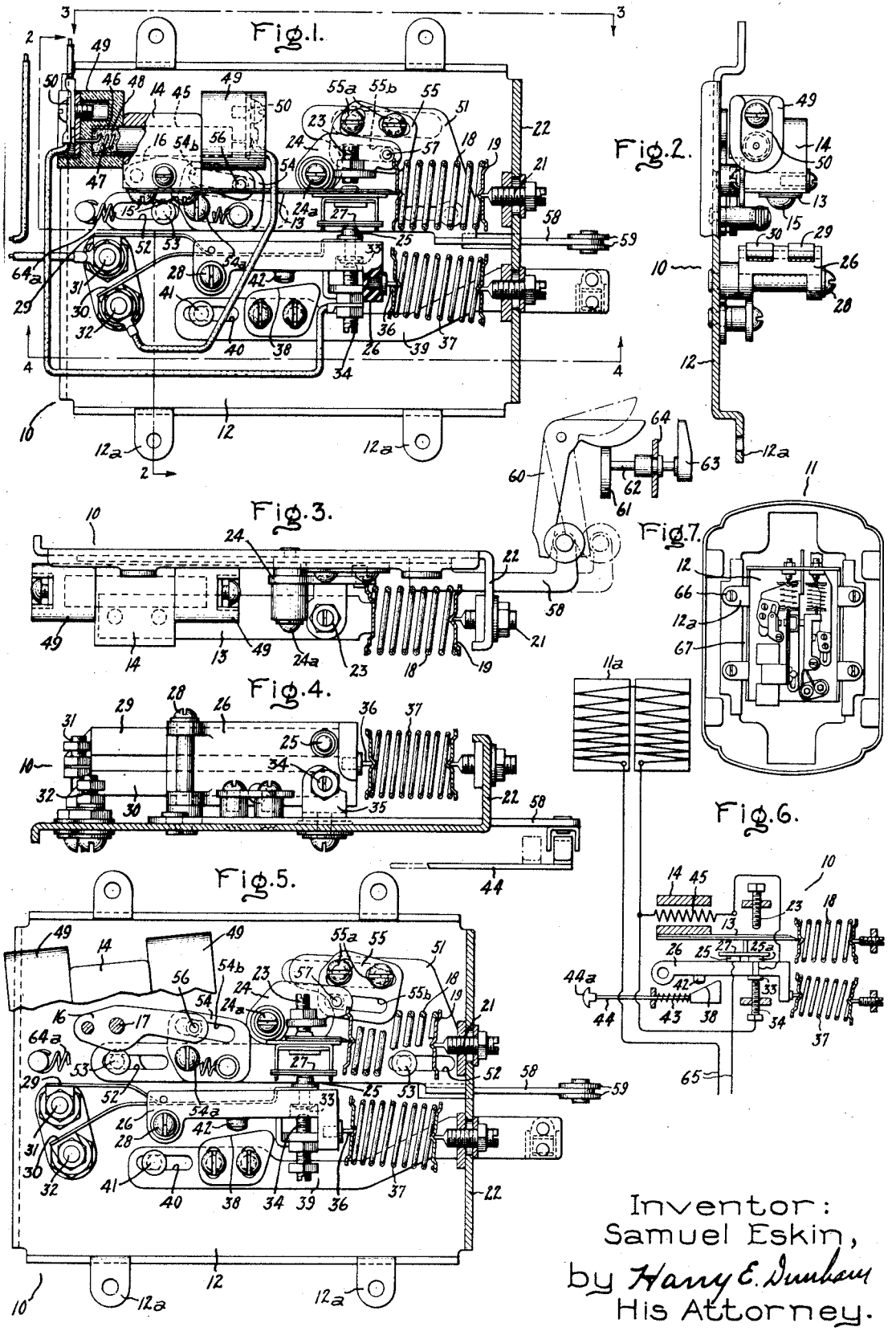

2,250,989

UNITED STATES PATENT OFFICE 2,250,989

TIMING DEVICE

Samuel Eskin, Chicago, Ill., assignor to Edison General Electric Appliance Company, Incorporated, Chicago, Ill., a corporation of Illinois Application March 11, 1938, Serial No. 195,332

11 Claims. (Cl. 161—16)

This invention relates to timing devices, more particularly to thermal timing devices for controlling the heating periods of appliances and the like, such as a bread toaster, and it has for its object the provision of an improved timing device of this character.

More specifically, this invention relates to improvements in thermal timing devices having a temperature responsive member that is heated and cooled during the heating period of the controlled device so that the temperature responsive member at the end of this heating period is restored substantially to its initial temperature condition; it therefore can be immediately reoperated to measure another heating period for the controlled device. And this invention contemplates the provision in thermal timers of this character of improved means for varying the setting of the timing periods, and especially, for effecting the adjustments necessary to vary the settings in a thermal timer for an electric toaster and for establishing the proper relationship between the first heating or toasting period when the toaster is at normal or room temperature, and the following toasting periods when the toaster is heated up substantially, and to maintain this relationship when its settings are changed for different degrees of toasting results, such as light, medium and dark.

This invention is especially applicable to the thermal timing device described and claimed in the copending application of Russell A. Winborne, Serial No. 195,347, filed March 11, 1938.

For a more complete understanding of this invention, reference should be had to the accompanying drawing in which Fig. 1 is a bottom plan view of a timing device embodying this invention, parts being shown in section so as to illustrate certain details of construction; Fig. 2 is a sectional view taken through the line 2—2 of Fig. 1 and looking in the direction of the arrows; Fig. 3 is a side elevation of the timing device when in its position of Fig. 1 looking in the direction of the arrows associated with the line 3—3; Fig. 4 is a sectional view taken through the line 4—4 of Fig. 1 and looking in the direction of the arrows; Fig. 5 is a view similar to Fig. 1, but showing parts in different operative positions, and having parts removed so as to illustrate certain details of construction; Fig. 6 is a diagrammatic representation of the timing device of Figs. 1–5 and illustrating it as applied to the control of the heating means of an electric toaster; and Fig. 7 is a bottom plan view of an electric toaster provided with a timing device arranged in accordance with this invention.

Referring to the drawing, this invention has been shown in one form as applied to a timing device 10 for controlling the toasting period of an electric toaster 11 which is provided with an electrical heating means 11a.

As shown, the timing device 10 comprises a base or supporting panel 12 formed of any suitable material, such as steel. Mounted upon the base 12 is a temperature responsive element 13, which preferably is of the bimetallic type, the element being formed of two metals having dissimilar temperature coefficients of expansion secured together lengthwise from end to end. Any two suitable materials, such as invar and steel, may be used. One end of the bimetallic bar 13, the left-hand end as viewed in the figures, is rigidly secured to a metallic supporting block 14 so as to be mounted edgewise to the base, as shown. The bimetal bar is secured to the block by means of screws 15. To the block 14 is rigidly mounted a lever arm 16, and said block is pivotally mounted on a post or standard 17 secured to the base 12. The major portion of the bar, as shown, is free to move laterally in response to temperature changes. Bearing on the free end of the bar 13 is a snap action, over-center, compression spring 18 having its opposite ends resting in shallow cups 19. One of these cups has a knife-edge bearing on the free end of the bimetallic bar 13, and the other has a similar bearing on a pivot screw 21. This screw is adjustably supported in an end wall 22 of the base 12. It will be understood that the spring 18 constitutes an over-center or snap acting spring for the bar 13. That is, it causes bar to move quickly between its controlling positions.

The first of these positions is defined by a stop 23 which, as shown, is in the form of a screw. The screw is threaded in a supporting arm 24 which is pivotally mounted on a post or standard 24a that is mounted on the base. The other controlling position of the bimetal bar 13 is defined by a pair of spaced contacts 25 and 25a (Figs. 1 and 6) mounted on a switch arm 26, the bimetal bar carrying on its free end a bridging contact 27 arranged to engage and bridge the contacts 25 and 25a. The switch arm 26 is formed of any suitable electrically insulating material, such as a suitable phenol condensation product, and the contacts 25 and 25a may be secured to it in any suitable manner.

The bimetal bar 13 is arranged to move downwardly, as viewed in Figs. 1 and 5, from its upper controlling position against the stop 23, as shown in Fig. 5, to its lower controlling position against the contacts 25 and 25a, as shown in Fig. 1, in response to an increase in temperature in the bar to a predetermined maximum, and it returns to its initial position of Fig. 5 when it cools to a predetermined minimum. The spring 18 is arranged to hold the bar in each of its controlling positions and resists movement of the bar from each of these positions to a neutral position and then assists the bar to move to its other controlling position in the manner set forth in the United States patent to A. Lewerenz, Reissue No. 16,654, dated June 14, 1927. This operation of the spring results in a quick snap action of the thermostatic bar.

The switch arm 26, as shown, is mounted on the base 12 for pivotal movement on an upright standard or post 28. Conducting leads or strips 29 and 30 on the switch arm 26 connect the two contacts 25 and 25a with two binding posts 31 and 32 mounted on the base 12 and insulated from it by means of suitable mica washers.

There is still a third contact 33 on the switch arm 26, on its lower side, as viewed in Figs. 1 and 5. This contact 33, as shown, is electrically connected through the switch arm with the contact 25a. The contact 33 is arranged to bear against a fixed adjustable contact 34 which, as shown, is in the form of a screw mounted in a bracket 35 attached to and insulated from the base 12. This contact 34 constitutes one controlling position of the switch arm 26, the other of which is defined by the bridging contact 27 when the thermostatic bar is in its position shown in Fig. 5.

Carried by the free or movable end of the switch arm 26 is a pivot bearing 36 which is engaged by an over-center compression spring 37 similar to the spring 18. This over-center spring 37 operates as does the spring 18 and holds the switch arm 36 in each of its controlling positions.

The switch arm is moved from its lower controlling position of Fig. 1 to its upper controlling position of Fig. 5 by a cam 38 mounted upon a cam slide 39 that is arranged to slide transversely of the plate 12. For this purpose, the slide is provided with an elongated slot 40 at its left-hand end, which is received by a pin or stud 41 mounted on base 12. At its right-hand end, the slide is directed through a slot (not shown) provided for it in the wall 22. The cam plate 38 engages a button 42 on the switch arm so that when the slide 39 is moved to the left, as viewed in the drawing, the cam 38 engages the button 32 to move the switch arm 26 from its lower position of Fig. 1 to its upper position of Fig. 5. The slide is biased toward the right by means of a spring 43, shown diagrammatically in Fig. 6, and is moved toward the left against the force of this spring by means of a suitable control arm 44, shown in Fig. 4 and also diagrammatically in Fig. 6. It will be understood that this control arm 44 will be directed to some suitable location where it can be conveniently operated by the attendant. The operating means for the rod 44 is shown diagrammatically in the form of a knob 44a.

For the purpose of heating the bimetallic bar 13 to cause it to move downwardly from its position of Fig. 5 there is provided a heating element 45 that is mounted in an aperture provided for it in the thermal mass 14. The heating element 45 may be of any suitable type, but preferably will be of the sheathed type, such as described and claimed in the United States patent to Charles C. Abbott, No. 1,367,341, dated February 1, 1921. Briefly, this heating element comprises a metallic sheath 46 in which is mounted a helical resistance conductor 47; this conductor is supported in spaced relation with reference to the sheath by a compacted mass 48 of an electrically insulating and heat conducting material, such as compacted powdered magnesium oxide. The terminals of the resistance conductor project outwardly from the ends of the sheath through insulating cups 49 in which are mounted binding strips 50. The thermal mass 14, as explained in the above-mentioned Winborne application, among other functions, compensates for stored heat in the toaster so that successive slices are toasted to substantially the same color. As there described, the stored heat capacity of the thermal mass is such that it will not cool down to its normal or room temperature at the end of the first toasting cycle, but will have heat stored in it so that the second cycle will be shorter than the first, because in the second it will require less time to heat the thermostat to its maximum temperature at which the heater is cut off. The third cycle is shorter than the second and so the time interval of each succeeding cycle is reduced until the toaster has attained its maximum operating temperature, when the cycles will have the same length of time. In other words, the thermal mass acts as a miniature of the toaster insofar as the thermal mass of the toaster is concerned.

The positions of the pivotally-mounted thermal mass or block 14 and the lever arm 16, and also the arm 24 that supports the stop 23 may be adjusted by means of a cam plate 51 that is mounted for transverse movement of the plate 12. For this purpose, the cam plate 51 is provided with a pair of elongated slots 52 that are received by spaced studs 53 mounted on the base 12. The cam plate is thus supported for transverse movement on a line substantially parallel to the line of movement of the cam plate 39. The cam plate 51 carries two cams 54 and 55 adjustably attached to the plate by means of screws 54a and 55a respectively. These cams carry cam slots 54b and 55b respectively which cooperate with pins 56 and 57 mounted respectively on the lever arm 16 for the thermal mass 14, and the arm 24 for the stop 23. In view of the foregoing arrangement, it will be observed that when the plate 51 is adjusted on the base 12 it will simultaneously adjust the positions of the thermal mass 14 and bimetal bar 13, and of the stop 23. The cam plate 51 has an extension 58 extending outwardly through the wall 22, the end of the member 58 carrying a pair of spaced discs 59. Operating between these discs 59 is a lever 60 having an angular shape, one arm, as shown, being received between the discs and the other being positioned to be engaged by a cam 61. The cam 61 is mounted on a shaft 62, the position of which may be adjusted by a knob 63 mounted on the shaft. It will be understood that the knob 63 will also be located so that it can be conveniently adjusted by an attendant. In a toaster, it will be mounted in a wall 64 of the toaster casing, such as the front wall, and preferably it will be located adjacent the control means 44a of the cam 38. The cam plate 51 is biased toward the left by means of a spring 64a.

As shown diagrammatically in Fig. 6, one side of an electrical supply source 65 is connected directly with one terminal of the toaster heating means 11a. The opposite terminal of this heating means is connected to one terminal of the heater 45 and also to the contact screw 34 that cooperates with the contact 33. The opposite terminal of the heater 45 is connected both to the contact 25a and the contact 33. The contact 25 is connected with the opposite side of the supply source 65. The connections between the various elements of the timing device have been indicated in Fig. 1.

In the operation of the timing device, it will be understood that when the thermostatic member 13 is in its upper controlling position, as shown in Fig. 5, and the switch arm is in its lower controlling position, as shown in Fig. 1, no current will flow through the heating means 11a of the toaster or the heating element 45. However, if the plate 39 be moved toward the left to cause the cam plate 38 to engage the button 42, it will upon continued movement snap the switch arm 26 from the position of Fig. 1 to the position of Fig. 5 against the bridging contact 27 of the thermostatic member. And when this happens a circuit will be completed from the supply source from one contact 25 to the other 25a through the bridging contact 27, and thence through the heater 45 to one terminal of the toaster heating means 11a, and through this heating means 11a to the opposite side of the supply source. The toaster will thus be energized and heat will also be imparted to the thermostatic member 13 from its heating means 45.

The thermostatic member 13 when its temperature attains a predetermined maximum will move downwardly from its first controlling position of Fig. 5 to its second controlling position of Fig. 1, also shown in Fig. 6, so that the contact 33 is moved against the fixed contact 34. When this occurs, it will be observed that the heating element 45 is shorted out of the energizing circuit, while the energizing circuit for the heating means 11a of the toaster will be maintained through the contacts 25, 25a and their bridging contact 27; thereupon, the thermostatic bar begins to cool and when it cools to a predetermined low temperature, it will snap back to its first controlling position against the stop 23, leaving the switch arm 26 against the contact screw 34 where it is held by its spring 37.

The timing interval, therefore, is measured by two periods, the first of which is the time required to heat the bimetal bar 13 to the maximum temperature at which it moves from its upper to its lower controlling position, and the second, the time required for it to cool to the minimum temperature at which it snaps back from the lower to its upper controlling position.

The length of the timing period, therefore, is controlled by the magnitude of the temperature range between the maximum and minimum temperatures at which the bimetal blade or bar 13 moves from its first controlling position and returns to this controlling position. This temperature range will be called the amplitude of the bar.

Varying the magnitude of the amplitude, therefore, will vary the time setting, and this is accomplished by changing the position of the stop 23. When the position of stop 23 is changed, it varies the distance between this stop and stop 34 for the switch arm; if this distance be increased, the amplitude is increased; if it be reduced the amplitude is reduced. The position of the stop is varied by shifting the position of the cam plate 51, as previously pointed out. When the plate is shifted to the right, it moves the stop 23 away from the stop 34 which increases the amplitude and the timing period for darker toast, whereas when the plate is shifted toward the left, the stop 23 is moved inwardly toward the stop 34 which decreases the amplitude and time setting for lighter toast.

The length of the first timing period of the first heat cycle is also controlled by varying the temperature setting of the bimetal bar 13; that is, by adjusting the timing device so that the bar moves from the stop at a different temperature. This is because when the amplitude only is varied to adjust the timing, the time periods will be properly varied for the second and succeeding cycles of operation, but not for the first which will remain substantially unchanged; the time period of the first cycle will not be materially changed because on the first cycle the time period is the time elapsed while the thermal bar 13 heats up from room temperature to some maximum at which it moves from stop 23 to engage contacts 25 and 25a and at which heat is removed from it, plus the time period required for it to return to stop 23 by cooling; in the second and subsequent cycles, the bar 13 operates between the maximum and minimum temperatures at which it returns to the stop 23, both of which are at an elevated range materially above room temperature, and the timing period in the second and following cycles is measured by this amplitude in temperature; but the time of the first cycle is proportional to the temperature at which it first moves to cut off the heat from itself—which temperature I will designate the first "off" temperature—and changing amplitude alone has little effect on this temperature. Therefore, in changing the time setting of the toaster, it is necessary not only to vary the amplitude, which changes the time period of the second and following cycles, but also to vary the temperature setting of the thermal bar 13 to vary the first "off" temperature of the first cycle. For example, if it is desired to adjust for darker toast, the temperature setting must be raised to give a longer first cycle, and the amplitude must be increased to give longer succeeding cycles; conversely, both the temperature setting and the amplitude will be reduced when adjusting for shorter time periods for lighter toast.

The temperature setting of the thermal bar 13 is varied by shifting the position of the bar, and this is accomplished by varying the position of the thermal mass 14 by adjusting the cam plate 54. When the position of the thermal mass is changed, that of the bimetallic bar 13 also is changed, and as a result, its pressure on the stop 23 is changed. When the mass 14 is rotated counterclockwise, this pressure is increased and this increases the temperature setting to elevate the first "off" temperature and when this pressure is reduced, it decreases this temperature setting. That is, when the temperature setting is increased the thermostat bar 13 moves from the stop 23 at a higher temperature, and when the setting is decreased, the bar 13 moves from the stop at a lower temperature. The cam plate 51 is arranged simultaneously to increase the temperature setting and the amplitude to increase the toasting interval for darker toast, and simultaneously to reduce the temperature setting and the amplitude to reduce the toasting interval for lighter toast. It will be observed that when cam plate 51 is moved toward the right, it simultaneously moves stop 23 away from stop 34 to increase the amplitude, and moves the mass 14 counterclockwise to increase the pressure of blade 13 against stop 23. The cams 54 and 55 are so arranged that even though stop 23 is moved away from stop 34, nevertheless the pressure of blade 13 on stop 23 is increased to increase the average temperature setting. This, as explained above, gives a darker toast. When cam plate 51 is adjusted toward the left, the stop 23 is moved inwardly and mass 14 is moved clockwise so that both amplitude and temperature setting are reduced so as to give a shorter time period for lighter toast.

Now in order to obtain a uniform color in successive slices for any given color setting, it is necessary to have a longer timing period for the first slice when the toaster is at room temperature than for the remainder of the slices when the toaster has been heated up substantially. As explained above, the thermal mass 14 controls the timing device to give this result.

Moreover, the difference in toasting time between the first slice and the second slice must be increased as the setting of the timing device is changed to increase the timing period for obtaining darker toast, and must be reduced when the timing period is shortened for lighter toast.

I establish the required difference in the time period between the first and succeeding slices when adjusting for a desired color of toast by superimposing on the adjustment for time setting, a correction for these differences. This is accomplished by shifting the average temperature setting a little higher when adjusting from light toast settings to dark toast settings. This increases the difference in time between the first and second slices and gives a longer toasting interval on the first slice. The cam 54 on cam plate 51 is positioned so as to accomplish this.

In Fig. 7, I have shown my improved thermal timing device as incorporated in a toaster. As shown, the plate 12 is provided with ears or tabs 12a which may be secured by screws 66 in the base of the toaster under the heating compartment 67.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A timing device comprising a temperature responsive member movable between a pair of positions to measure a time interval, said temperature responsive member having a predetermined temperature range, the member moving from one position to the other at the maximum temperature of said range and returning to said one position at the lower temperature of said range, means for adjusting said temperature range, means for adjusting the temperature setting of said temperature responsive element, and a single control member for the two adjusting means operably associated with them to effect simultaneous adjustments of said temperature range and said temperature setting.

2. A thermal timing device for an electrically heated appliance comprising a temperature responsive member movable between a pair of controlling positions and controlling said appliance to heat for the period of time that said temperature responsive member is initially in the first of said positions and while it moves from the first position to the second and returns to the first, heating means controlled by said temperature responsive member to apply heat to said temperature responsive member when initially in said first position and while it moves from the first to the second controlling position whereupon the heat is removed from the member to permit it to cool, means for adjusting the distance between said controlling positions, means for adjusting the temperature setting of said temperature responsive member, and a common control member for the two adjusting means operably associated with them so that when it is operated it effects simultaneous adjustments of said distance and said temperature setting to vary the timing interval.

3. A thermal timing device comprising a temperature responsive element movable from a first position to a second position when heated and returning to said first position when cooled, means controlled by the movement of said temperature responsive element from said first position to the second position and from the second back to the first for measuring a timing period, a normally stationary stop defining said first position, means adjustably mounting said stop so that its position may be changed to vary said first position, means for adjusting said temperature responsive element to vary its pressure on said stop, and a common operative member for said adjusting means for said temperature responsive element and the adjustable mounting means for said stop for simultaneously adjusting the position of said stop and the pressure of said temperature responsive element on said stop so as to vary the length of said timing period.

4. A thermal timing device for an electric toaster and the like comprising a bimetallic thermostat bar having one end relatively fixed and its other end free to move between controlling positions as it heats and cools, means for heating said bar to move it from the first to the second position, the bar returning to the first when it cools, means controlled by the bimetallic bar for maintaining an energizing circuit for said toaster as the bar moves from the first to the second and until it returns to the first, a stop defining the first position, means mounting the fixed end of said thermostat bar so that its position and thereby its temperature setting can be adjusted, means mounting said stop for adjustment to vary the distance between said first and second positions, and a common operating member for effecting the adjustments of said bimetallic thermostat bar and said stop.

5. A thermal timing device comprising a support, a thermostat on said support, means movably mounting said thermostat on said support, a stop on said support which said thermostat normally engages defining a first controlling position, the thermostat when heated to a predetermined maximum temperature leaving said stop and moving to a second controlling position and when cooled to a predetermined minimum temperature returning to said stop, means movably mounting said stop, a cam plate on said support cooperating with said mounting means for said thermostat and stop for adjusting their positions simultaneously when the position of the cam is changed, and means for varying the position of said cam.

6. A thermal timing device comprising a support, a thermostatic bar on said support, a second support for said bar pivotally mounted on said first support, a stop on said first support which said bar normally engages defining a first controlling position, the bar when heated to a predetermined maximum temperature leaving said stop and moving to a second controlling position and when cooled to a predetermined minimum temperature returning to said stop, a third support for said stop pivotally mounted on said first support, and a cam plate slidably mounted on said first support and having cam slots engaging cam pins on said second and third supports for said thermostatic bar and said stop arranged by sliding movement on said first support simultaneously to adjust said two supports.

7. A thermal timing device for a heating appliance and the like comprising a control arm and a thermostatic bar, each operable between a pair of controlling positions and each having an over-center spring acting on it to move it with a snap action between said positions, a heating element for applying heat to said thermostatic bar, switching elements controlled by said thermostatic bar and control arm arranged when the control arm is moved to one of its positions and said thermostatic bar is in one of its positions to close the energizing circuit for said heating appliance and said heating element, the thermostatic bar thereupon being heated and when attaining a predetermined maximum temperature snapping from said one to its other controlling position to snap the control arm to its other position, and said switching elements arranged when the thermostatic bar and control arm are in said other positions to deenergize said heating element to remove heat from the bar, and the bar when cooling to a predetermined degree snapping back to its first position, the switch elements being operated thereby to open the energizing circuit of said heating appliance, a stop defining said one position of said thermostatic bar, pivotally mounted supports for said thermostatic bar and said stop, and means for simultaneously adjusting the positions of said supports to vary the time setting of said timing device.

8. A timing device for a toaster comprising a bimetallic temperature responsive member movable between a pair of controlling positions and having a predetermined temperature range, the member moving from the first position to the second at the maximum temperature of said range and returning to the first at the lower temperature of said range, the temperature responsive member attaining an average temperature as it operates between said positions, the toasting period being measured by the time period elapsed while said temperature responsive member is initially in said first position and also while it moves from and returns to said first position, means controlling the heating of said temperature responsive member to reduce the second time period of the toaster as the toaster heats up, a control member, and means operated by said control member for adjusting both the setting of said temperature responsive member to vary said average temperature and the maximum and minimum temperatures of said range to adjust the time setting for a desired color of toast, and also for increasing the difference in time between the first and second slices when adjusting for increased time intervals for darker toast and for decreasing said difference in time when adjusting for decreased time intervals for lighter toast.

9. A thermal timing device for a toaster comprising a temperature responsive member movable between a pair of controlling positions and controlling said toaster to heat for the period of time that said temperature responsive member is initially in the first of said positions and while it moves from the first position to the second and returns to the first, heating means controlled responsively to the movement of said temperature responsive bar so as to apply heat to said temperature responsive member while it is in said first position initially and while it moves from the first to the second controlling position, whereupon the heat is removed from said member to permit it to cool, the temperature responsive member attaining an average temperature condition when moving between said positions for any given temperature setting, means controlling the heating of said temperature responsive member to reduce the second time period of the toaster as the toaster heats up, and means for adjusting simultaneously the distance between said controlling positions and said temperature setting to vary the timing interval for a desired color of toast, and also for increasing the difference in time between the first and second slices when adjusting for increased time intervals for darker toast and for decreasing said difference in time when adjusting for decreased time intervals for lighter toast.

10. A timing device comprising a temperature responsive member movable between a pair of positions to measure a time interval, means controlled responsively to movement of said temperature responsive member between said positions for heating said member to a predetermined maximum temperature at which it moves from one to the other of said positions and for removing the heat when it reaches said other position to permit it to cool, the member returning to said one position upon cooling to a predetermined low temperature, a control member, and means operated by said control member for varying simultaneously the temperature setting of said temperature responsive member and the range between said maximum and minimum temperatures to vary the time interval for a desired color of toast, and for increasing the difference in time between the first and second slices when adjusting for increased time intervals for darker toast, and for decreasing said difference in time when adjusting for decreased time intervals for lighter toast.

11. A timing device comprising a temperature responsive member movable between a pair of positions to measure a time interval, means controlled responsively to movement of said temperature responsive member between said positions for heating said member to a predetermined maximum temperature at which it moves from one to the other of said positions and for removing the heat when it reaches said other position to permit it to cool, the member returning to said one position upon cooling to a predetermined low temperature, a control member, and means operated by said control member for varying simultaneously the temperature setting of said temperature responsive member and the range between said maximum and minimum temperatures to vary the time interval for a desired color of toast, and also for varying the difference in time between the first and second slices when the time setting is changed so as to maintain uniform said desired color of toast.

SAMUEL ESKIN.